Feb. 28, 1933.                G. E. PRENTICE                1,899,479
                                FASTENER UNIT
                              Filed Oct. 3, 1932
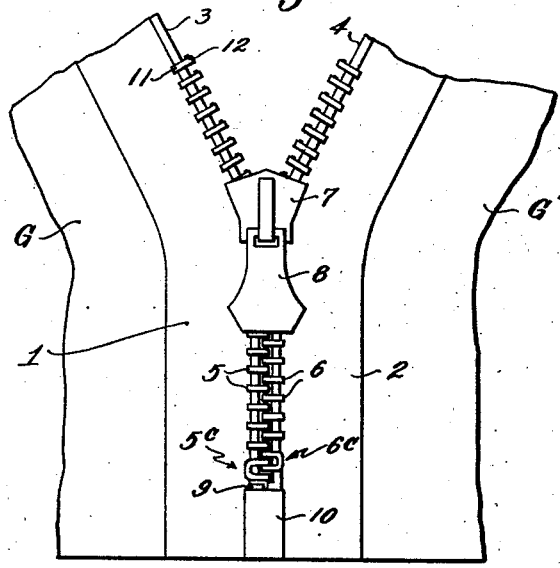
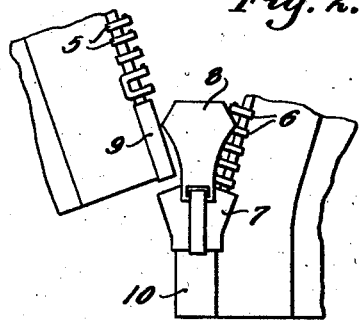
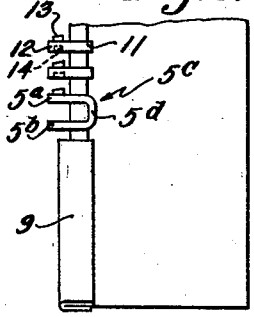
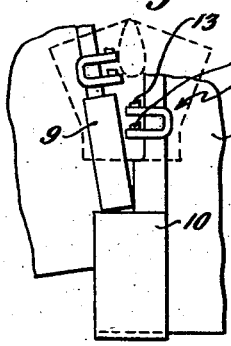
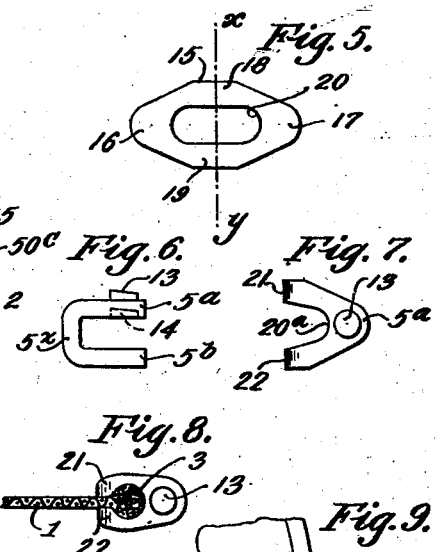
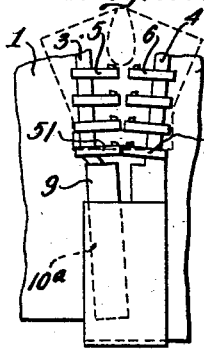
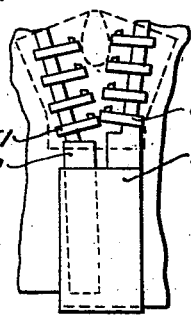
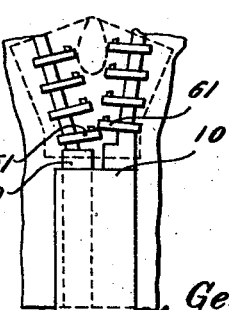
Inventor,
George E. Prentice,
by Roberts Cushman Woodbury
Attys.

Patented Feb. 28, 1933

1,899,479

UNITED STATES PATENT OFFICE

GEORGE E. PRENTICE, OF BERLIN, CONNECTICUT

FASTENER UNIT

Application filed October 3, 1932. Serial No. 635,930.

This invention pertains to slide actuated fasteners for use on garments etc. and relates more particularly to a novel fastener unit particularly intended for use in conjunction with a separable end stop of the kind sometimes employed in fasteners of this kind.

The copending application of Robert C. Legat, Serial No. 562,464, discloses a fastener provided with a simple and desirable form of separable end stop comprising a socket member attached to one stringer at the end of the series of independent fastener units mounted on the latter, and a cooperating pin member attached to the other stringer at the end of its series of fastener units,—the pin member being adapted to telescope within the socket member by relative longitudinal movement of said parts. When the pin is fully and properly seated within the socket member, the fastener units at the ends of the opposed series are disposed in proper staggered relation so that upon longitudinal movement of the slider the units of the opposed series are readily caused to interengage. However, by reason of haste or carelessness, the operator sometimes fails completely properly to seat the pin in its socket before attempting to manipulate the slider, and under these conditions the endmost independent units of the opposed series may abut substantially end on, thus causing the slider to bind. In order to overcome the resistance of the slider, the operator is prone to exert considerable strength in attempting to pull the slider lengthwise of the series of fastener elements and may thus eventually compel the end units to tip far enough about their points of anchorage to the stringers to enable one to slip past the other. However, such action, especially if frequently repeated, tends to weaken the stringers so that the endmost units eventually become loose and thus interfere with free operation of the slider under any condition.

To avoid this difficulty I interpose between the last of the independent fastener elements of each series and the pin and socket members respectively of the end stop a duplex guide unit which is very firmly and permanently attached to its respective stringer. This guide unit comprises a stringer-engaging part and a pair of spaced parallel arms which are fixedly and preferably integrally united to the stringer-engaging part, and which project outwardly beyond the edge of the stringer to substantially the same distance as do the fastener elements. Both of these arms may be plain, that is to say devoid of any elements such as pins, sockets or the like, adapted to have holding engagement with a complemental element of an opposed unit, although I prefer to make the upper arm at least of the duplex unit substantially identical in form and function with the next adjacent independent fastener element of the corresponding series. By rigidly, and preferably integrally, uniting the two arms of the duplex unit to a stringer-engaging portion of substantial length longitudinally of the stringer, the area of contact between the stringer and unit becomes so great as to afford a very secure and reliable anchorage such as to prevent loosening or displacement of the upper arm of the unit, which as above noted preferably functions as the lowermost effective fastener element of the series.

As an example of the utility of my invention I have here described and illustrated it as applied to a fastener having a separable end stop of substantially the kind disclosed in the aforesaid application of Legat, but wish it to be understood that my improved duplex guide unit is of broad utility whether employed with a separable end stop of the kind illustrated or with other forms of end stop. For purposes of illustration I have herein shown the fastener elements as individually of the type disclosed, for example, in my Patent No. 1,658,392, dated February 7, 1928, although the specific character of the individual fastener elements employed may be varied at will within the scope of the present invention.

In the accompanying drawing wherein I have illustrated certain selected embodiments of my invention by way of example, Fig. 1 is a fragmentary front elevation illustrating a slide-operated fastener having a separable bottom stop and duplex end units constructed in accordance with the present invention, the slider being shown as having moved upwardly away from the end stop in the fastener closing direction;

Fig. 2 is a fragmentary front elevation showing the slider engaging the socket member of the end stop and the pin member of the end stop positioned ready for insertion through the slider channel into the socket member;

Fig. 3 is a fragmentary rear elevation to larger scale illustrating the lower part of the left-hand stringer of Figs. 1 and 2 and showing the pin member of the end stop, with the duplex lower unit interposed between the top of the pin member and the lowermost of the usual fastener elements;

Fig. 4 is a view similar to Fig. 2, to larger scale, showing the slider in dotted lines and the end of the pin member of the stop just about to enter the socket member, but illustrating a duplex unit of modified type;

Fig. 5 is a plan view to large scale illustrating a blank useful in preparing the duplex unit of the present invention;

Fig. 6 is a side elevation of the duplex unit made from the blank of Fig. 5, showing the upper arm of such duplex unit provided with a pin and socket while the lower arm is plain;

Fig. 7 is a plan view of the duplex unit of Fig. 6, showing its shape before attachment to the stringer;

Fig. 8 is a transverse horizontal section, to large scale, through a stringer showing the duplex unit of Fig. 7 after attachment thereto;

Fig. 9 is a fragmentary front elevation of the lower end of a stringer provided with a stop pin of curved contour such as is useful when the pin and its cooperating socket are of substantial length, and also illustrating a duplex unit of further modified construction having both arms plain; and Figs. 10, 11, and 12 are fragmentary front elevations illustrating the action which sometimes takes place when ordinary fastener elements are employed adjacent to the end stop.

Referring to the drawing, and particularly to Fig. 1, the letters G and G′ respectively represent the right and left-hand front portions of a garment, for example a sweater, provided with the improved fastener forming the subject matter of the present invention. This fastener comprises the usual flexible stringers 1 and 2 attached to the garment portions G and G′, respectively, such stringers having the beaded edges 3 and 4 carrying the opposed series of fastener elements 5 and 6, respectively. The opposed series of fastener elements are moved into engaging interlocking relation by means of a slider 7 of any appropriate construction having convergent guide channels and provided with an actuating pull tab 8. The lower ends of the stringers 1 and 2 carry the co-operating end stop members 9 and 10 respectively, the member 9 being a pin member secured to the edge of the stringer 1, and the member 10 being a socket member secured to the stringer 2. The pin member 9 is adapted to be inserted in the upper end of the socket member 10 and to telescope therein, and when the parts are in the proper position for interengagement of the opposite series of fastener elements, the lower end of the pin member 9 is in substantial engagement with the lower end of the socket member 10.

Each of the fastener elements 5 and 6, respectively, preferably comprises a stringer-engaging portion 11 by which the fastener element is firmly anchored to the stringer, and an outwardly projecting portion 12 extending beyond the edge of the stringer and adapted to enter between adjacent projecting portions of fastener elements of the opposite series. As here shown, the projecting portion of the usual fastener element 5 or 6 is provided with an upwardly projecting pin 13 and with a correspoding socket 14 at its under side, such pin and socket as here shown being substantially of the type disclosed in my Patent No. 1,658,392 dated February 7, 1928, although the particular form of fastener element and the interlocking parts carried thereby forms no essential feature of the present invention.

In accordance with this invention I arrange a rigid unitary duplex guide unit at the lower end of each series of independent fastener elements. Thus, as indicated in Fig. 3, for example, the duplex unit comprises arms 5ᵃ and 5ᵇ integrally united to a stringer-engaging portion 5ᵈ so as to form the duplex unit 5ᶜ. Similarly at the lower end of the series of elements 6 I arrange a duplex unit 6ᶜ (Fig. 1). As shown in Figs. 1, 2 and 3 the upper arm of this duplex unit is substantially identical in form and function with the independent fastener elements of the series, being furnished with a pin 13 and socket 14, while the lower arm 5ᵇ is plain, that is to say, it is not provided with holding or interlocking members such as the pin or socket.

The duplex unit is conveniently formed from a metal blank, such as illustrated in Fig. 5. This blank consists of an elongated piece 15 of metal, stamped or punched from sheet material if desired, and which is widest at its middle portion with its end portions 16 and 17 tapered and preferably rounded at their extremities while its central side portions 18 and 19 may have substantially straight edges. The central part of this blank is cut out to provide the symmetrically disposed slot 20. This blank is then bent substantially along the axis x—y midway of its longer dimension so as to form the bends 21 and 22, Fig. 7, and to bring the end portions 16 and 17 into substantially parallel spaced relation thereby to form the arms 5ª and 5ᵇ (Fig. 6). In side elevation the duplex unit is thus of substantially U-shape with its upper and lower arms parallel and united by the bent portions 21 and 22. As indicated in Fig. 7, the end portions of the slot 20 are brought into registry so as to form the recess 20ª adapted to receive the beaded edge 3 of the stringer, as shown in Fig. 8. The bent portions 21 and 22 are then forced together as shown in Fig. 8 so as to embrace the bead 3 and firmly anchor the duplex unit to the stringer. Since the duplex unit is of substantial extent longitudinally of the bead, as indicated at 5ˣ (for example in Fig. 6), a very firm and secure anchorage is thus afforded, capable of preventing tilting of the unit on the stringer or loosening of the unit during continued use.

In the construction illustrated in Figs. 1 to 8 inclusive, the duplex unit is provided with the pin 13 and corresponding socket 14 in its upper arm 5ª only. Such pin and socket may be made either before or after the blank is bent and in any convenient manner familiar to those skilled in the art. In the arrangement shown in Fig. 4, the upper and the lower arms of the duplex unit 50ᶜ are each provided with holding or interlocking elements, such as the pins 13 and corresponding sockets. On the other hand in the arrangement illustrated in Fig. 9 the duplex unit 500ᶜ has its both upper and lower arms or fastener elements 5ª and 5ᵇ plain, that is to say without interlocking members. In this latter figure, I have also illustrated a desirable form of end stop pin 9ª applied to the bead 3ª of the stringer 1ª, such end stop pin being curved longitudinally so as to enable it to enter a corresponding socket member (not shown) more readily. This curved construction is particularly useful when the socket and pin are of substantial length.

The utility of my duplex guide unit will be apparent by consideration of Figs. 10, 11 and 12, in which I have illustrated an action which commonly takes place when individual independent fastener elements are employed adjacent to the end stop members. Thus, as illustrated in Fig. 10, if the operator fail to insert the pin member 10 to the proper depth in the socket member, the lowermost fastener units 51 and 61 come directly opposite to each other, and any attempt to move the slider upwardly causes the parts to bind. Upon feeling any unusual resistance to movement of the slider, the tendency is for the operator to exert considerable force in the attempt to move the slider upwardly. This strains the fastener units and eventually may cause the unit 61, for example, to ride over the unit 51 but only after these units have tipped upwardly to an abnormal extent (Fig. 11). This tipping of these units tends to loosen their anchorage to their respective stringers, so that if eventually they assume the proper positions as shown in Fig. 12, the repeated tipping of these end units tends to loosen them so that eventually they will hang down freely on their stringers and make it difficult, even though the pin member 9 be properly seated in its socket, to move the slide upwardly in its closing movement.

By the use of the duplex unit, such as hereinabove described, wherein the lowermost fastener element or arm of the unit is rigidly secured in parallel relation to the upper arm, it is impossible for the lower arm to tilt or tip abnormally. Furthermore, since this lower arm is secured to the stringer by means of the longitudinal elongate portions 5ˣ (Fig. 6), which furnish a substantial area contact with the stringer, a much firmer anchorage is obtained than is possible with an individual fastener element, and thus even though the operator should exert a great deal of force in attempting to move the slider when the parts are improperly positioned, it is practically impossible by such action to loosen the duplex unit so as to displace its upper arm. Thus the life of the fastener is greatly prolonged, as compared with usual constructions, but without substantial sacrifice of the desired flexibility of fasteners of this type since the provision of the duplex unit adjacent to the end stop does not appreciably affect the operation of the fastener as a whole or necessitate modification or replacement of the usual fastener elements except those adjacent the end stop.

While I have illustrated my invention as applied to a fastener having one specific form of end stop, and while I have illustrated duplex fastener units of one desired construction, I wish it to be understood that the invention is not thereby limited but that the duplex unit herein described may be useful with other fasteners and with other forms of end stop.

I claim:

1. In a fastener of the class described having a pair of flexible stringers, a series of fastener elements carried by each stringer, each fastener element having a stringer engaging portion and a single arm which projects beyond the edge of the stringer for cooperative engagement with the projecting arm of a fastener element of the opposite series, the projecting arms of adjacent fastener elements of each series being movable relatively to each other, in combination, a single guide unit disposed at the end of each series of fastener elements, each guide unit comprising a stringer engaging portion and a plurality of arms adapted to project outwardly beyond the edge of the stringer, said arms being disposed in spaced substantially parallel relation and each being rigidly joined to the stringer engaging portion of the guide unit and rigidly spaced from the other arm of said unit, one at least of said arms of the guide unit being devoid of any element capable of holding engagement with an element carried by the opposed stringer.

2. A guide unit for use in slide operated fasteners of the kind having a series of fastener elements attached to the edge of a flexible stringer, said unit consisting of a single elongate piece of sheet material of maximum width at its central portion and tapering toward each end from maximum to a minimum width and having an elongate symmetrically disposed slot therein, said material being doubled at its shorter median line to bring its tapered end portions into substantially parallel spaced relation, the bends of the material at each side of said slot constituting anchoring elements for engagement with opposite sides of the stringer.

3. A guide unit for use in slide operated fasteners of the kind having a series of fastener elements attached to the edge of a flexible stringer, said unit having upper and lower arms disposed in substantially parallel spaced relation, one of said arms being plain and the other having a pin and socket.

4. In a fastener of the class described having a pair of flexible stringers, a series of independent fastener elements carried by each stringer, each fastener element comprising a stringer engaging part and a single arm which projects beyond the edge of the stringer for cooperative engagement with the projecting arm of a fastener element of the opposite series, in combination, a single U-shaped guide unit adjacent to the endmost fastener element of each series, the arms of the guide unit projecting in parallel relation beyond the edge of the stringer, and the bend of the guide unit being anchored to the stringer.

5. A fastener of the class described comprising a pair of flexible stringers, a series of independent fastener elements carried by each stringer, a separable end stop comprising interengageable members carried by the respective stringers at one end of the series of fastener elements carried thereby, each of the fastener elements having a stringer engaging portion and a single arm which projects beyond the edge of the stringer for cooperation with the projecting arm of a fastener element of the opposite series, the separable end stop having a socket member attached to one stringer and a pin member attached to the other stringer, and a guide unit interposed between the endmost independent fastener element of each series and the pin and socket members, respectively, said guide unit having a stringer-engaging part integrally joined to upper and lower arms which project beyond the edge of the stringer.

6. A fastener of the class described comprising a pair of flexible stringers, a series of independent fastener elements carried by each stringer, a separable end stop comprising interengageable members carried by the respective stringers at one end of a series of fastener elements carried thereby, each of the fastener elements comprising a stringer engaging part and a portion which projects beyond the edge of the stringer for cooperation with the projecting portion of the fastener element of the opposite series, the interengaging members of the stop member consisting of a socket member attached to one stringer and a pin member attached to the other stringer, and a guide unit interposed between the endmost independent fastener element of each series and the pin and socket members, respectively, said guide unit having a stringer-engaging part integrally joined to upper and lower arms which project beyond the edge of the stringer, the upper arm being substantially like the projecting portion of one of the independent units, and the lower arm being plain.

7. A fastener of the class described comprising a pair of flexible stringers, a series of independent fastener elements carried by each stringer, a separable end stop comprising interengageable members secured to the respective stringers at one end of the series of fastener elements carried thereby, each of the fastener elements having a stringer engaging part and a part which projects beyond the edge of the stringer for cooperation with the projecting part of a fastener element of the opposite series, successive projecting parts being independent of and movable relatively to the projecting parts next above and below them respectively on the same stringer, the interengageable members of the stop consisting of a socket member and a pin member, respectively, and a guide unit interposed between the endmost independent fastener element of each series and the corresponding stop member, said unit comprising a stringer-engaging part integrally joined to upper and lower arms which project beyond the edge of the stringer, at least one of the projecting arms of said unit being similar in all substantial particulars to the projecting part of an independent fastener element of the series.

8. A fastener of the class described comprising a pair of flexible stringers, a series of independent fastener elements carried by each stringer, a separable end stop comprising interengageable members carried by the respective stringers at one end of the series of fastener elements carried thereby, each of the fastener elements comprising a stringer engaging part and a portion which projects beyond the edge of the stringer for cooperation with the projecting portion of the fastener element of the opposite series, the interengageable members of the stop being a socket member and a pin member, respectively, and a guide unit interposed between the endmost independent fastener element of each series and the corresponding stop member, said unit comprising a stringer-engaging part integrally joined to upper and lower arms which project beyond the edge of the stringer, each of said arms being plain and devoid of interlocking parts.

Signed by me at Berlin, Connecticut, this 27th day of September, 1932.

GEORGE E. PRENTICE.